United States Patent [19]

Thornley

[11] Patent Number: 4,639,808
[45] Date of Patent: Jan. 27, 1987

[54] ASYMMETRICAL SHIELDS FOR CONTROLLING FEEDTHROUGH IN READ/WRITE HEADS

[75] Inventor: Richard Thornley, Boulder County, Colo.

[73] Assignee: Storage Technology Corporation, Louisville, Colo.

[21] Appl. No.: 655,011

[22] Filed: Sep. 26, 1984

[51] Int. Cl.⁴ .................... G11B 5/115; G11B 5/14; G11B 5/27

[52] U.S. Cl. .................................... 360/121; 360/113; 360/128

[58] Field of Search ................ 360/121, 129, 113, 128

[56] References Cited

U.S. PATENT DOCUMENTS

| | | | |
|---|---|---|---|
| 3,975,772 | 8/1976 | Lin | 360/113 |
| 4,001,890 | 1/1977 | Kayser | 360/121 |
| 4,072,993 | 2/1978 | Nomura et al. | 360/121 |
| 4,320,428 | 3/1982 | Somers | 360/121 |

Primary Examiner—Robert S. Tupper
Attorney, Agent, or Firm—Woodcock, Washburn Kurtz Mackiewicz & Norris

[57] ABSTRACT

An improved magnetic tape transducer of the type having both a write head and a read head in the same assembly, includes asymmetrical shields disposed on either side of a magnetoresistive element comprising the read head in order to reduce magnetic feedthrough between the write head and the read head. The shield upon the side of the magnetoresistive element which is closer to the write head has a thinner cross-section than the shield on the other side, thereby balancing the amount of coupled flux from the write head and reducing the resultant feedthrough.

6 Claims, 2 Drawing Figures

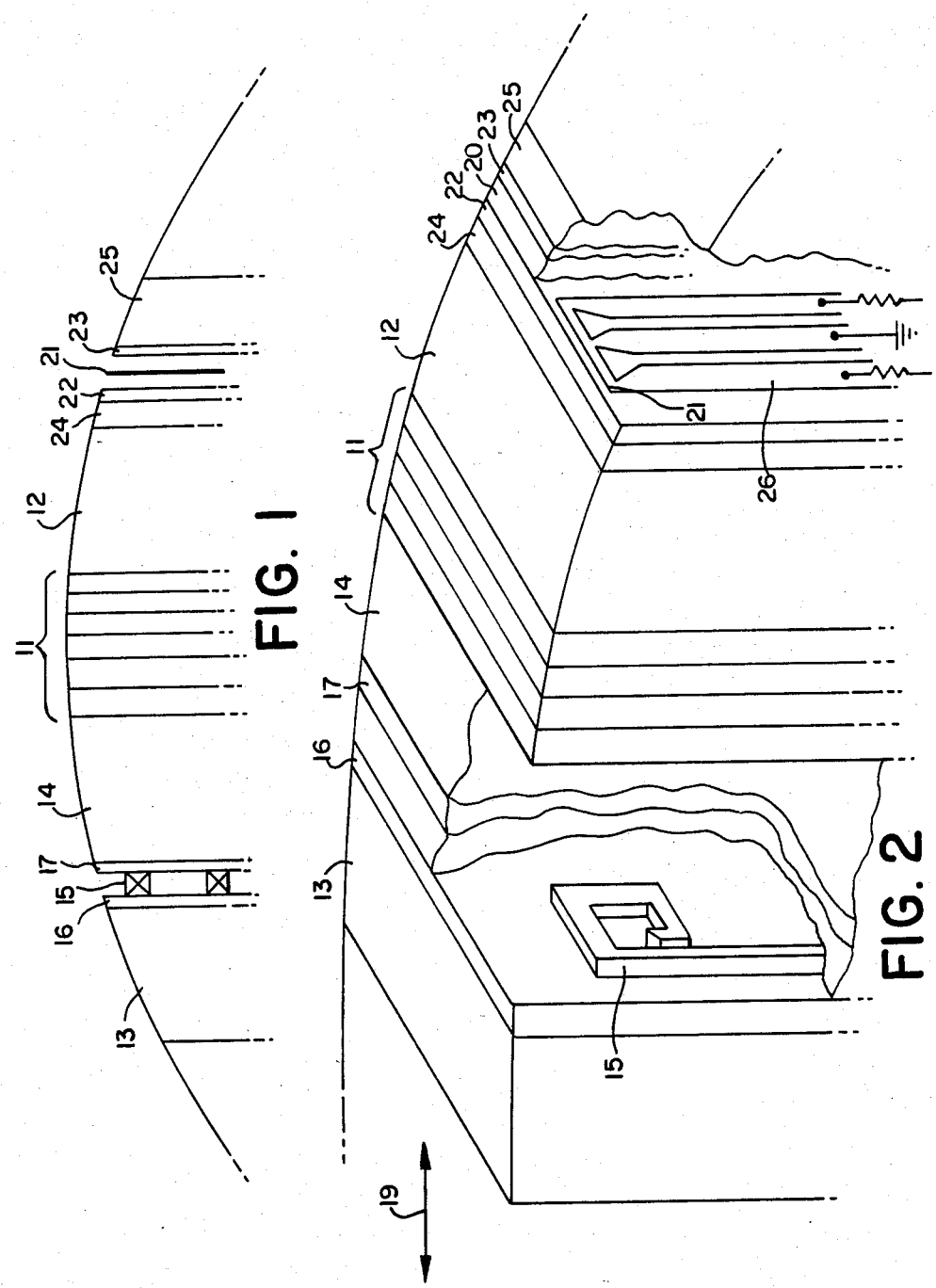

ASYMMETRICAL SHIELDS FOR CONTROLLING FEEDTHROUGH IN READ/WRITE HEADS

BACKGROUND OF THE INVENTION

This invention relates to magnetic heads of the type used in magnetic tape systems, and more particularly, to improved heads which reduce feedthrough from the write head to the read head.

Magnetic transducers are extensively used in magnetic data recording systems such as magnetic tape and magnetic disk units for computer systems.

Magnetic tape systems particularly employ transducers with both a write head and a read head in the same assembly. These transducers are used at increasingly high speeds, at increasingly higher frequencies and with smaller distances separating the read and write heads.

Recently, thin film processes have been used in making magnetic tape transducers. These heads are produced by a photoresist process in which conductive elements are laid down on an insulating material. The read and write heads are closely spaced in a unitary assembly.

The foregoing and other factors have contributed to an increasing problem with feedthrough between the write head and the read head. This feedthrough is a direct magnetic coupling between the signal applied to the write head and the read head.

It is an object of the present invention to reduce feedthrough from the write head to the read head in a magnetic transducer.

SUMMARY OF THE INVENTION

In accordance with the present invention, a transducer for writing data to and reading data from a magnetic medium, has a shielded magnetoresistive head with the read shield closer to the write head being thinner than the read shield on the other side of said head to reduce magnetic coupling between the write head and the read head.

I have found that a significant portion of the high frequency feedthrough signal is caused by magnetic flux which enters the ends of the read shield. In prior art transducer assemblies, this flux is unbalanced because the shields are symmetrical and because the flux entering the shield closest to the write head is stronger than the flux entering the other shield. This imbalanced flux is coupled through the magnetoresistive head, thereby inducing a feedthrough signal.

In accordance with the present invention, the area of the exposed end of the read shield closer to the write coil has an area which intercepts approximately the same magnetic flux from the write head as does the area of the end of the read shield furthest from the write head. By making one read shield thinner than the other, the amount of directly coupled flux from the write head is balanced, thereby reducing the feedthrough signal.

The same approach can be used to reduce feedthrough in inductive heads.

The foregoing and other objects, features and advantages of the invention will be better understood from the following detailed description and appended claims.

SHORT DESCRIPTION OF THE DRAWINGS

FIG. 1 depicts a cross-section of the magnetic transducer of the present invention; and FIG. 2 is a broken-away perspective view of the transducer.

DESCRIPTION OF THE PREFERRED EMBODIMENT

The transducer includes a center section 11 which typically has laminations 11 of copper and nickel iron. A non-magnetic spacer 12, usually of ceramic, separates the read shields 24 and 25 and the read element 21 from the center section 11.

The write head is on the other side of the center section. It includes ferrite shields 13 and 14, and a write coil 15 formed by photographically depositing a conductor on an insulating member 16 such as silicon nitrite. A similar insulator 17 separates the write coil from ferrite shield 14. The ends of the heads, shields, and center section form a curved surface. The magnetic tape travels along this curved surface in proximity to the transducer in the direction indicated by the arrows 19.

The read element 21 is in the read gap 20. A shielded magnetoresistive head includes the conductors 26 laid down on an insulated surface 22. The read shields 24 and 25 are typically nickel iron.

In accordance with the present invention, the read shield 24, which is closer to the write head, is thinner than the read shield 25. In accordance with the present invention, this reduces magnetic feedthrough between the write head and the read head.

This may be explained by considering the spatial variation in the magnitude of the writing field. The writing field is strongest in the gap between shields 13 and 14, decreasing with distance in a complex way. It follows that the field intensity at read shield 24 is higher than that at shield 25. In the absence of this invention, this inequality results in more magnetic flux entering shield 24 than shield 25. It is this difference, that is primarily responsible for the feedthrough signal. In this invention, the surface areas of shields 24 and 25 are adjusted to eliminate this inequality, thus reducing the magnitude of the feedthrough signal.

The present invention is particularly useful in suppressing feedthrough in transducer assemblies wherein multiple heads read and write data from multiple track tapes. In such assemblies, where the read head is closely spaced to the write head, most of the feedthrough is from the associated write head. Where this is the case, the difference in thickness of the read head shields significantly reduces feedthrough.

While a particular embodiment of the invention has been shown and described, various modifications are within the true spirit and scope of the invention. The appended claims are, therefore, intended to cover all such modifications.

What is claimed is:

1. A transducer for writing data to and reading data from a magnetic medium comprising:
    a magnetically shielding center section;
    a write head disposed on one side of said center section; and
    a read head on the other side of said center section, said read head including
    a shielded magnetoresistive element and
    first and second read shields, and on each side of said magnetoresistive element, the read shield closest to said write, head being thinner than the other read shield to reduce magnetic feedthrough between said write head and said read head.

2. The transducer recited in claim 1 wherein said center section, write head and read head have ends which are positioned adjacent to said recording medium and present a uniform, curved surface to said recording medium and wherein write and read gaps extend substantially perpendicular to said curved surface.

3. The transducer recited in claim 1 wherein said read head is a thin film head formed by depositing a conductive layer on an insulating material.

4. The transducer recited in claim 1 wherein said write head comprises:

ferrite shields disposed on each side of a write gap created therebetween; and a conductive write coil deposited on an insulator adjacent to one of said ferrite shields in said write gap.

5. The transducer recited in claim 1 wherein the end of the read shield closest to said write coil has an area which intercepts approximately the same magnetic flux coupled directly from said write head as the area of the end of the read shield furthest from said write head.

6. The transducer recited in claim 1 in a multiple head assembly for reading and writing data from multiple track magnetic tapes.

* * * * *